United States Patent [19]

Roulinson et al.

[11] Patent Number: 5,405,170

[45] Date of Patent: Apr. 11, 1995

[54] AUTOMOTIVE CONDUIT CONNECTOR WITH AXIAL ACTIVATION AND PREPOSITIONING CARRIER

[75] Inventors: Daniel A. Roulinson, Wyandotte; Algis Zaparackas, Farmington Hills, both of Mich.

[73] Assignee: Ford Motor Company, Dearborn, Mich.

[21] Appl. No.: 270,546

[22] Filed: Jul. 5, 1994

[51] Int. Cl.⁶ .............................................. F16L 33/20
[52] U.S. Cl. ..................................... 285/39; 285/114;
285/23; 285/242; 285/244; 24/20 R; 24/20 S; 24/339
[58] Field of Search .................... 285/23, 39, 242, 238, 285/114, 244; 24/20 S, 20 R, 16 R, 339

[56] References Cited

U.S. PATENT DOCUMENTS

| | | | |
|---|---|---|---|
| 1,177,500 | 3/1916 | Dolson | 24/20 R |
| 2,958,549 | 11/1960 | Spafford | 285/243 |
| 3,249,370 | 5/1966 | Brogden | 285/114 |
| 3,881,753 | 5/1975 | Bochory | 285/114 |
| 4,093,282 | 6/1978 | Kyriakodis | 285/114 |
| 4,380,096 | 4/1983 | Nishida et al. | 24/20 R |
| 4,502,189 | 3/1985 | Sieber Krob et al. | 285/114 |
| 4,773,129 | 9/1988 | Muhr . | |
| 4,858,279 | 8/1989 | Kato et al. . | |
| 4,882,814 | 11/1989 | Takahashi | 285/242 |
| 4,930,191 | 6/1990 | Takahashi et al. . | |
| 5,203,809 | 4/1993 | Oetiker . | |
| 5,309,609 | 5/1994 | Janiszewski et al. | 24/339 |

Primary Examiner—Eric K. Nicholson
Attorney, Agent, or Firm—Jerome R. Drouillard; Roger L. May

[57] ABSTRACT

A fluid conduit connector assembly includes a prepositioning carrier for mounting a connector assembly upon a first fluid conduit segment, a hose clamp portion attached to the prepositioning carrier for maintaining the hose clamp in position for engagement with a second fluid conduit segment, and an axially directed activation member for maintaining the hose clamp portion in a retracted configuration prior to engagement of the hose clamp portion with the second fluid conduit segment. The hose clamp portion is movable to a non-retracted configuration when the activation member is slidingly withdrawn in an axial direction from the hose clamp portion.

9 Claims, 2 Drawing Sheets

AUTOMOTIVE CONDUIT CONNECTOR WITH AXIAL ACTIVATION AND PREPOSITIONING CARRIER

BACKGROUND OF THE INVENTION

The present invention relates to a connector for joining two fluid conduits, particularly in an automotive environment.

DISCLOSURE INFORMATION

As automotive engine compartments have become increasingly crowded with various fluid handling systems such as vacuum distribution systems, electrohydraulic braking systems, multi-point fuel injection systems, air conditioning systems, and other fluid handling systems, the ability to access the various components within these systems so as to have the capability of installing hose clamps and other conduit conductors has become severely impaired. Screw-type hose clamps, although providing a secure fastening means, require an excessively long period of time to install, which impairs their usefulness with high speed automotive production lines. Although some clamps have been developed which may be set with the removal of a single part, such clamps generally require that a removable blank be taken from the clamp by moving the blank in a radial direction which, of course, severely limits the usefulness of such clamps inasmuch as freedom of movement in a radial direction is frequently not achievable in automotive engine compartments. As shown in FIG. 1, the present conduit connector with axial activation and a prepositioning carrier obviates problems with prior hose connectors by providing a device which is axially positionable and which may be set by axially disengaging an activation member from the clamp so as to allow a clamp portion to move from a retracted to a non-retracted configuration.

SUMMARY OF THE INVENTION

According to the present invention, a conduit connector assembly includes a prepositioning carrier for mounting the connector assembly upon a first fluid conduit segment, a hose clamp portion attached to the prepositioning carrier and spaced axially therefrom such that the hose clamp portion is maintained in position for engagement with a second fluid conduit segment, and an axially directed activation member for maintaining the hose clamp portion in a retracted configuration prior to engagement of the hose clamp portion with the second fluid conduit segment. The hose clamp portion is movable to a non-retracted configuration when the activation member is slidingly withdrawn in an axial direction from the hose clamp portion. The hose clamp portion is preferably rigidly attached to the prepositioning carrier, which is preferably coaxial with the hose clamp portion. The axially directed activation member may comprise a manually slidable linear body. The hose clamp portion preferably comprises a hollow, generally cylindrical body having a plurality of radially extending retractor tabs forming a pocket for the activation member when the hose clamp portion is in the retracted configuration, such that the tabs and the activation member maintain the hose clamp portion in the retracted configuration when the activation member is located in the pocket, while allowing the hose clamp portion to move to the non-retracted configuration once the activation member is withdrawn from the pocket. The generally cylindrical body preferably comprises an annular spring band having two free ends, with a radially extending retractor tab structure attached to each of the ends, with the retractor tabs being engageable by the activation member so as to maintain the hose clamp portion in the retracted configuration prior to engagement of the hose clamp portion with the second fluid conduit segment.

In another preferred embodiment, the prepositioning carrier itself comprises a hose clamp portion for mounting the connector assembly upon a first fluid conduit segment and for sealing a joint between the first fluid conduit segment and a mating fluid conduit. The prepositioning carrier may itself comprise an elastically releasable annular spring band which is coaxial with the earlier described spring band, and which is released by a common activation member.

It is an advantage of the present invention that an automotive fluid conduit connector according to the present invention is easily set in place without tools by manually removing an activation member once the connector has been positioned over a fluid conduit. It is yet another advantage of the present invention that a conduit connector according to the present invention may be used for the purpose of connecting two adjacent conduits because of the fact that the present connector assembly may employ two axially separated hose clamps, with one of the clamps being in a normally open position prior to installation of the connector in a fluid conduit system.

DETAILED DESCRIPTION OF THE PREFERRED EMBODIMENTS

Figure 1:
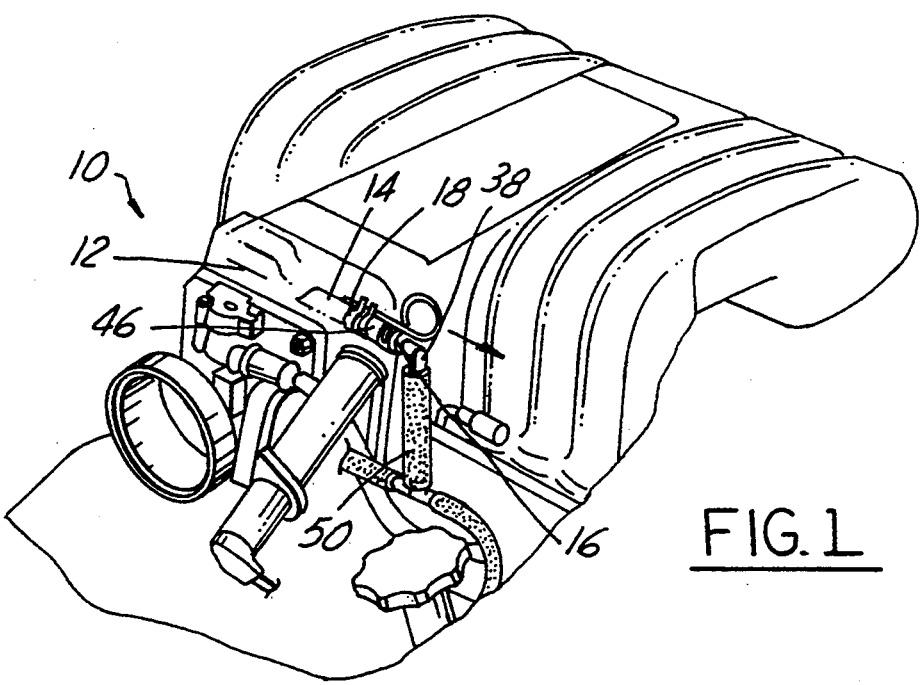
FIG. 1 is a partial perspective view of an automotive engine having a fluid conduit connector according to the present invention.
Figure 2:
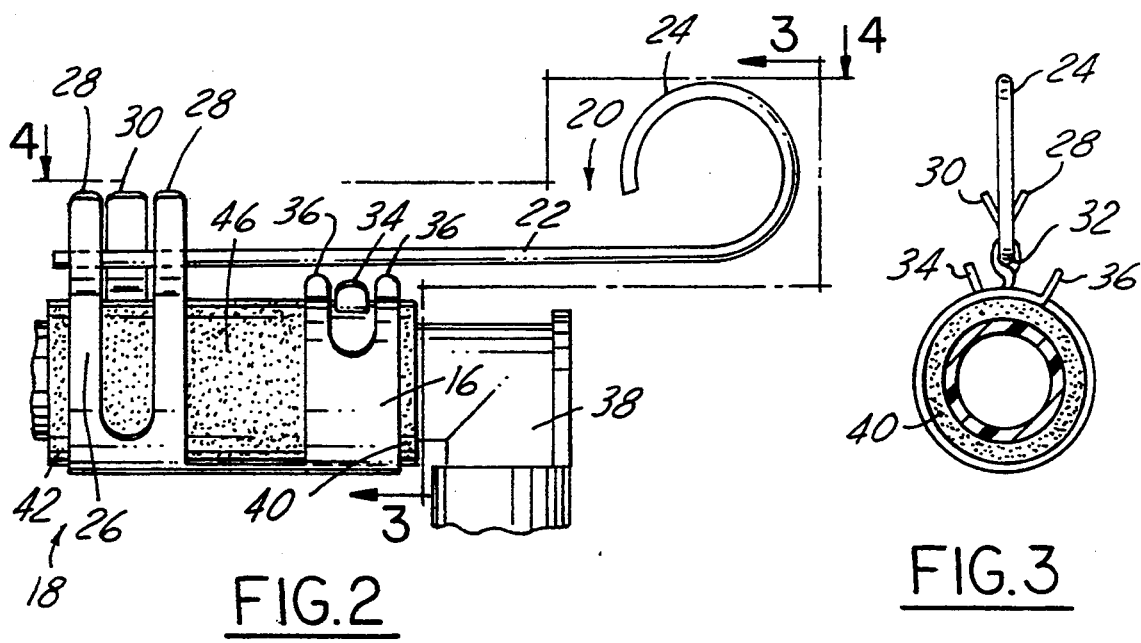
FIG. 2 is an enlarged view of a portion of a FIG. 1 showing the present connector installed in a fluid handling system.

As shown in FIG. 1, an automotive engine 10 has a throttle body 12, with a cylindrical vacuum port 14 extending therefrom. In this illustration, a fluid conduit connector assembly according to the present invention is used for the purpose of connecting a vacuum system to vacuum port 14. According to the present invention, first hose clamp portion 16 of the connector, which functions as a prepositioning carrier, encircles first fluid conduit segment 40, which in turn is connected with mating fluid conduit 38. In other words, first hose clamp portion 16 maintains a short length of hose, 46, (FIG. 2) in contact with mating fluid conduit 38, which in this case comprises an elbow uniting vacuum hoses 46 and 50 (FIG. 1).

Figure 3:
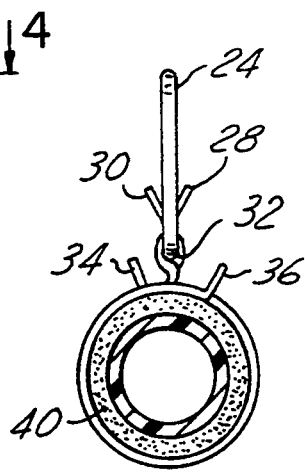
FIG. 3 is an end view taken along the line 3—3 of FIG. 2.
Figure 4:
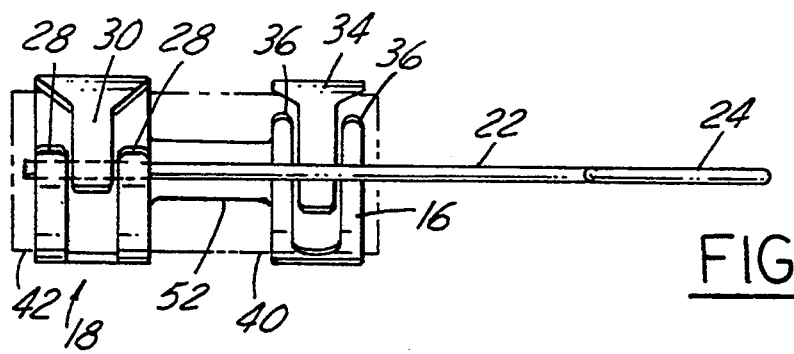
FIG. 4 is a plan view taken along the line 4—4 of FIG. 2.

As shown in FIGS. 1, 2, 4, 5, and 7, a fluid conduit connector assembly according to the present invention has hose clamp portion 18 which comprises a hollow, generally cylindrical body 26, which in this case is an annular spring band having two free ends with at least one radially extending retractor tab structure attached to each of the ends. Thus, a single retractor tab 30 is attached to one end of spring band 26 with two opposing retractor tabs 28 being attached to the other free end of spring band 26. Together, tabs 28 and 30 form pocket 32 (FIGS. 3 and 6). Axially directed activation member 20, which preferably comprises a wire having finger loop 24 and shank 22, is inserted into pocket 32. During the time in which shank 22 is within the pocket, annular spring band 26 will be in the retracted or open position, as illustrated in phantom in FIG. 6. While in the retracted position, hose clamp portion 18 allows the fluid conduit connector assembly to be engaged with another fitting, such as vacuum port 14. Then, hose clamp portion 18 may be allowed to move to the non-retracted configuration shown in solid lines in FIG. 6, when annular spring band 26 moves to the non-retracted configuration once activation member 20 is withdrawn from pocket 32.

First hose clamp portion 16, which serves as the prepositioning carrier for mounting a connector assembly upon first fluid conduit segment in the illustrated embodiments, may have a variety of configurations known to those skilled in the art and suggested by this disclosure. The configuration illustrated in the various figures of this specification is merely illustrative of one such possible configuration. As with second hose clamp portion 18, the first hose clamp portion has an annular spring band having outside tabs 36 and an opposing inside tab 34. In this manner, the first hose clamp portion 16 may serve to sealingly engage a hose such as hose 46 of FIGS. 1 and 2—with a mating fluid conduit such as elbow 38. Because a fluid conduit connector assembly according to the present invention has the two halves which are joined rigidly by a bridge 52, as shown specifically in FIGS. 2, 4, and 7, and because the first and second hose clamp portions are coaxial, the present connector may be used to join two adjacent tubes in the event that a short portion of hose is inserted into the connector assembly, with the assembly being connected initially to a first tube inserted telescopically into the hose, which is clamped by first hose clamp portion 16.

Figure 5:
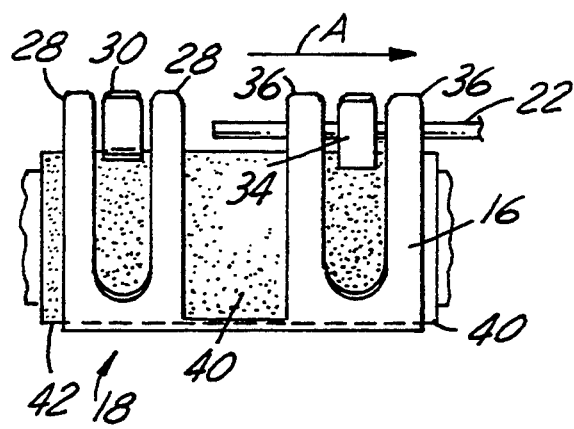
FIG. 5 illustrates a second embodiment of a conduit connector assembly according to the present invention.
Figure 6:
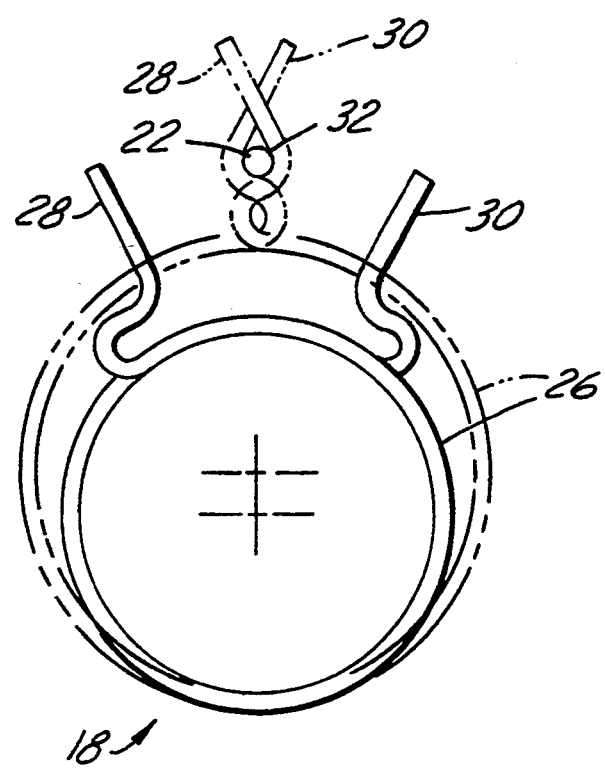
FIG. 6 is an end view of a hose clamp portion of a connector according to the present invention showing the positions of the retractor tabs in the retracted and non-retracted configurations.
Figure 7:
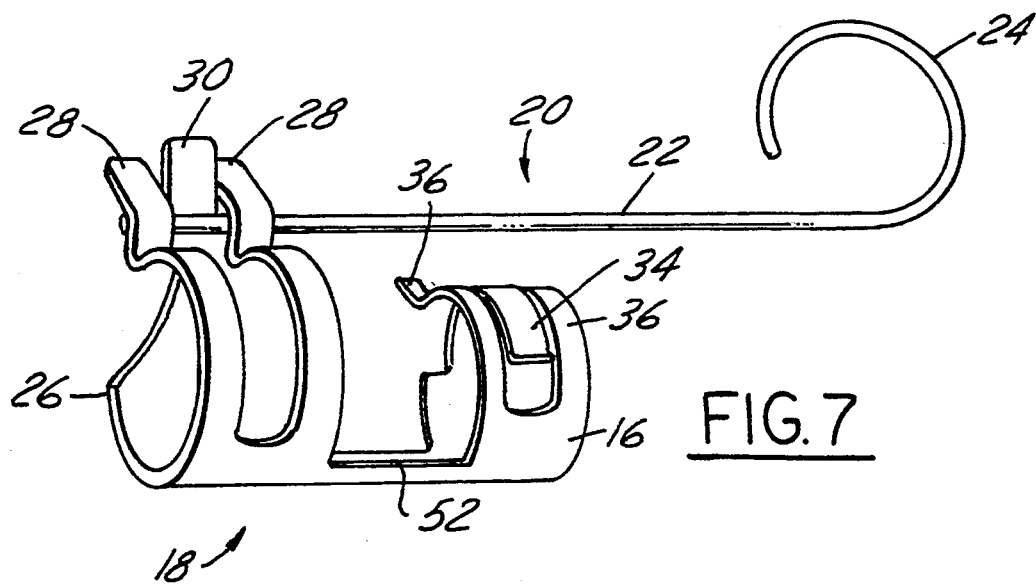
FIG. 7 is a perspective view of a conduit connector according to the present invention.

As shown in FIG. 5, a connector according to the present invention may be equipped with axially releasable annular spring bands on each end, with the result that the connector may be positioned freely upon fluid conduits at each end while annular spring bands 26 and 58 are in the retracted configuration. Once the connector is positioned over two portions of one or more fluid conduits, both spring bands are releasable, as shown in FIG. 5, by the axial withdrawal in direction A of activation member 20. In this manner the connector of Figure may be positioned at any point along a fluid conduit prior to release of the spring bands.

While the invention has been shown and described in its preferred embodiments, it will be clear to those skilled in the arts to which it pertains that many changes and modifications may be made thereto without departing from the scope of the invention.

We claim:

1. A fluid conduit connector assembly comprising:
    a prepositioning carrier for mounting the connector assembly upon a first fluid conduit segment;
    a hose clamp portion attached to said prepositioning carrier and spaced axially therefrom, such that said hose clamp portion is maintained in position for engagement with a second fluid conduit segment; and
    an axially directed activation member for maintaining the hose clamp portion in a retracted configuration prior to engagement of the hose clamp portion with said second fluid conduit segment, with said hose clamp portion being movable to a non-retracted configuration when said activation member is slidingly withdrawn in an axial direction from the hose clamp portion.

2. A fluid conduit connector assembly according to claim 1, wherein said hose clamp portion is rigidly attached to said prepositioning carrier.

3. A fluid conduit connector assembly according to claim 1, wherein the prepositioning carrier and the hose clamp portion are coaxial.

4. A fluid conduit connector assembly according to claim 1, wherein the axially directed activation member comprises a manually slidable linear body.

5. A fluid conduit connector assembly according to claim 4, wherein said hose clamp portion comprises a hollow, generally cylindrical body having a plurality of radially extending retractor tabs forming a pocket for said activation member when the hose clamp portion is in the retracted configuration, such that the tabs and said activation member maintain the hose clamp portion in the retracted configuration when the activation member is located in the pocket, while allowing the hose clamp portion to move to the non-retracted configuration once the activation member is withdrawn from the pocket.

6. An automotive fluid conduit connector assembly comprising:
    a generally cylindrical prepositioning carrier for mounting the connector assembly upon a first fluid conduit segment;
    a hose clamp portion rigidly attached to said prepositioning carrier, with said hose clamp portion and said carrier being coaxial and spaced axially such that said carrier maintains the hose clamp portion in position for engagement with a second fluid conduit segment, with said hose clamp comprising an annular spring band having two free ends, with a radially extending retractor tab structure attached to each of said ends; and
    an axially directed activation member for engaging each of said tabs so as to maintain the hose clamp portion in a retracted configuration prior to engagement of the hose clamp portion with said second fluid conduit segment, with said hose clamp portion being movable to a non-retracted configuration when said activation member is slidingly withdrawn from the tabs.

7. An automotive fluid conduit connector assembly according to claim 6, wherein said prepositioning carrier comprises a hose clamp portion for mounting the clamp assembly upon a first fluid conduit segment and for sealing a joint between the first fluid conduit segment and a mating fluid conduit.

8. An automotive fluid conduit connector assembly comprising:
    a prepositioning carrier for mounting the connector assembly upon a first fluid conduit segment, with said carrier comprising a first hose clamp portion for mounting the connector assembly upon the first fluid conduit segment and for sealing a joint between the first fluid conduit segment and a mating fluid conduit;

a second hose clamp portion rigidly attached to said prepositioning carrier, with said first and second hose clamp portions being coaxial and spaced axially such that said first hose clamp portion maintains the second hose clamp portion in position for engagement with a second fluid conduit segment, with said second hose clamp comprising an elastically releasable annular spring band having two free ends, with a radially extending retractor tab formed integrally at each of said ends; and an axially directed activation member for engaging each of said tabs so as to maintain the hose clamp portion in a retracted configuration prior to engagement of the hose clamp portion with said second fluid conduit segment, with said hose clamp portion being elastically movable to a non-retracted configuration when said activation member is slidingly withdrawn from the retractor tabs.

9. An automotive fluid conduit connector assembly comprising:

first and second hose clamp portions rigidly attached to each other, with said first and second hose clamp portions being coaxial and spaced axially with each of said hose clamp portions comprising an elastically releasable annular spring band having two free ends, with a radially extending retractor tab formed integrally at each of said ends; and an axially directed activation member for engaging each of said tabs so as to maintain both hose clamp portions in a retracted configuration prior to engagement of the hose clamp portions with at least one fluid conduit segment, with said hose clamp portions being elastically movable to a non-retracted configuration when said activation member is slidingly withdrawn from the retractor tabs.

* * * * *